United States Patent [19]
Ackermann

[11] Patent Number: 5,925,083
[45] Date of Patent: Jul. 20, 1999

[54] METHOD OF CORRECTING STEERING OF A ROAD DRIVEN VEHICLE

[75] Inventor: Jürgen Ackermann, Herrsching, Germany

[73] Assignee: Deutsche Forchungsanstalt fur Luft und Raumfahrt E.V., Cologne, Germany

[21] Appl. No.: 08/986,789

[22] Filed: Dec. 8, 1997

[30] Foreign Application Priority Data

Dec. 7, 1996 [DE] Germany ............................ 196 50 691

[51] Int. Cl.⁶ ...................................................... G06F 19/00
[52] U.S. Cl. ............................ 701/41; 701/42; 280/5.51; 280/211; 280/775; 280/779; 180/421; 180/422; 180/446
[58] Field of Search .................................. 701/41, 42, 71; 280/775, 779, 211, 5.51

[56] References Cited

U.S. PATENT DOCUMENTS

| | | | |
|---|---|---|---|
| 5,515,275 | 5/1996 | Ackermann | 701/41 |
| 5,579,245 | 11/1996 | Kato | 701/41 |
| 5,734,570 | 3/1998 | Arlandis | 701/41 |

Primary Examiner—William A. Cuchlinski, Jr.
Assistant Examiner—Olga Hernandez
Attorney, Agent, or Firm—Browdy and Neimark

[57] ABSTRACT

To support the driver of a road vehicle, a yaw velocity r (in radian/s) around a vertical axis is measured, a driving speed $v_x$ (in m/s) is determined, an acceleration $a_x$ (in m/s²) in the driving direction is measured, a lateral acceleration is measured at two randomly selected locations at a distance of $l_a$ as $a_{y1}$ (in m/s², front) and $a_{y2}$ (m/s², rear), a steering wheel angle $\delta_H$ is measured at the vehicle steering column with a potentiometer, a vehicle wheel angle $\delta_L = \delta_H / i_L$ commanded by the driver is computed, a variable angle $\beta_F$ at the front axis is computed, and these measured parameters are used to calculate, in a microprocessor, according to the equations (4, 20 and 21), an additional steering angle $\delta_C$, whose addition to the vehicle wheel angle $\delta_L$ commanded by the driver results in the overall wheel angle $\delta_F = \delta_L + \delta_C$.

11 Claims, 3 Drawing Sheets

METHOD OF CORRECTING STEERING OF A ROAD DRIVEN VEHICLE

FIELD OF THE INVENTION

The present invention relates to computerized of a road vehicle.

REVIEW OF THE RELATED TECHNOLOGY

In order to steer a car, a driver must solve two partial problems, namely the directional control and the yaw stabilization. With respect to the directional control, the driver, by looking ahead, continually navigates a current line of travel based on the current position and speed of the vehicle, with the starting tangent of said line of travel being predefined by the velocity vector. To navigate the vehicle—envisioned here as a mass point—along this line of travel, the driver must impress onto the vehicle a lateral acceleration via the steering wheel. With dry road conditions and a good line of sight, this directional control is a well-mastered routine for the driver.

A real vehicle, however, does not act like a mass points but instead has a moment of inertia and performs a yaw movement around a vertical axis. A normal yaw movement does not require any attention on the part of the driver. However, dangerous situations arise when unexpected yaw movements occur which may be caused by braking on icy streets, for example, or by side-winds or a blown tire. This causes a disturbance torque the vertical axis, resulting in a yaw movement which surprises the driver. Because of his reaction time and subsequent overreaction, the driver frequently does not master these situations quickly and skillfully enough to prevent an accident.

Automatic driver support systems can react faster and more precisely than a human being and can thus prevent accidents. These systems are servo-systems which measure the yaw movement, for example with a yaw rate sensor, and generate a counter torque to balance out the causing disturbance torque. This counter-moment may be generated, for example, by means of individual wheel braking (see A.Th. van Zanten, R. Erhardt, G. Pfaff, "Die Fahrdynamikregelung von Bosch" in Automatisierungstechnik 1996, p. 359–365) or supplemental steering of the rear wheels or front wheels, respectively (see J. Ackermann, T. Bünte, W. Sienel, H. Jeebe, K. Naab, "Falrsicherheit durch robuste Lenkregelung" in Automatisierungstechnik 1996, p. 219–225).

The individual wheel brake has the advantage that it can be built inexpensively by expanding the existing ABS-technology. However, in comparison to the supplemental steering systems it also has conceptual drawbacks. One of these drawbacks is the fact that with a different road adhesion on the right and left, the individual wheel brakes prevent a vehicle from skidding at the price of a longer stopping distance, whereas supplemental steering systems can compensate for disturbance torque caused by asymmetrical brake forces and thus render skid prevention and a short brake path compatible.

A steering system can furthermore be operated continually, whereas the brake—for reasons of energy consumption and wear and tear—is only automatically activated in the case of an emergency. Lastly, if a required counter torque is generated by steering rather than braking, lower tire forces are necessary since the leverarm of the force with respect to the center of gravity of the vehicle is approximately twice as great.

Supplemental rear-wheel steering systems have been developed primarily by Japanese manufacturers. The principal objective has been to improve the maneuverability of all-wheel steered vehicles and to reduce the understeer in curves. More recently, however, the support of the driver against disturbance torque has emerged as a further goal. Due to the high costs of all-wheel steering systems, however, they have not been widely implemented.

The following evaluation is therefore based on a supplemental front-wheel steering system. It is a fundamental characteristic of controlled systems that the dynamics of these systems are modified through feedback. For nominal vehicle parameter values, such as the mass, the moment of inertia, the tire parameters, etc., as well as for nominal operating conditions, such as the driving speed, the road conditions, etc., an optimized controller design results in improved dynamics. At the same time, however, the dynamics may be worsened for other parameter values—a problem for which complex parameter estimates and controller adaptations are regarded as the answer.

In robust control, on the other hand, the goal is to use a controller with a fixed setting to cover a large range of possible parameter values. The commonly applied methods estimate the effect of parameter fluctuations and attempt to keep this effect to a minimum in the controller optimization.

The applicant has used a different route which is not based on a numerical optimization of the controller for a certain vehicle, but rather on a detailed analysis of the structural characteristics of simple mathematical vehicle models.

The basic theory behind the method developed by the applicant was to strictly separate, in a preliminary step, the two partial problems of the steering process, namely the directional control and the yaw stabilization, for random vehicle parameters and operating conditions. According to the systems theory, a feedback control law achieves nonobservability of the yaw rate from the lateral acceleration of the vehicle (at a location to be specified at a later time) or, which is equivalent, nonobservability of the yaw rate from the tire slip angle of the front tires. This characteristic is also referred to as robust unilateral decoupling.

Interestingly, this theoretical approach results in a conclusive solution in the form of a control algorithm which is implemented in a microprocessor in the vehicle and results in a precise actuation of the steering motor for the supplemental front-wheel steering. The basic form of this method has been patented in DE 40 28 320 and was implemented in an experimental vehicle. Practical driving tests demonstrated significant safety advantages of the concept for side-wind and braking with asymmetrical road adhesion. (See J. Ackerman et al, as listed above).

The control method according to DE 40 28 320 was based on several simplified assumptions which are, at best, approximated in practice. Specifically, it was assumed that:
a) the vehicle has an ideal mass distribution in which the moment of inertia can be represented by two masses which are concentrated at the front and rear axle, respectively. This assumption was well met in the experimental vehicle but it cannot be applied to any random vehicle. The suggestion had been made to generalize the control law for deviating mass distributions, however, this method would still be based on the presumption that the center of gravity of the vehicle does not shift. Such a shifting of the center of gravity is fairly common, however, for example if a heavy load is placed in the trunk;
b) The dependence of the tire sideforce on the tire slip angle was linearized with the aid of the cornering stiffness. However, the most significant robustness issue for the steering of a vehicle is the road adhesion behavior, which is non-linear and can change very quickly according to the road conditions.

c) The driving speed should only change insignificantly during the steering action so that it was assumed to be constant. However, the control law has not yet been improved for conditions of sudden acceleration and braking.

A further shortcoming of the method according to DE 40 28 320 is the fact that, unlike in the conventional vehicle, a reduced yaw damping occurs at high speeds.

SUMMARY OF THE INVENTION

It is therefore the object of the invention to improve on the basic theory of the unilateral robust decoupling of yaw and lateral movements of the vehicle in a manner so that the above described limitations are eliminated. This object is accomplished by the invention, As opposed to the method according to DE 40 28 320, the method according to the invention is applicable to a larger group of vehicles and operating conditions where safety is a critical factor. The method according to the invention furthermore makes it possible to establish a desired yaw damping.

BRIEF DESCRIPTION OF THE DRAWING

The invention is explained in detail below, based on the drawings in which.

DETAILED DESCRIPTION OF THE PREFERRED EMBODIMENT

Figure 1:
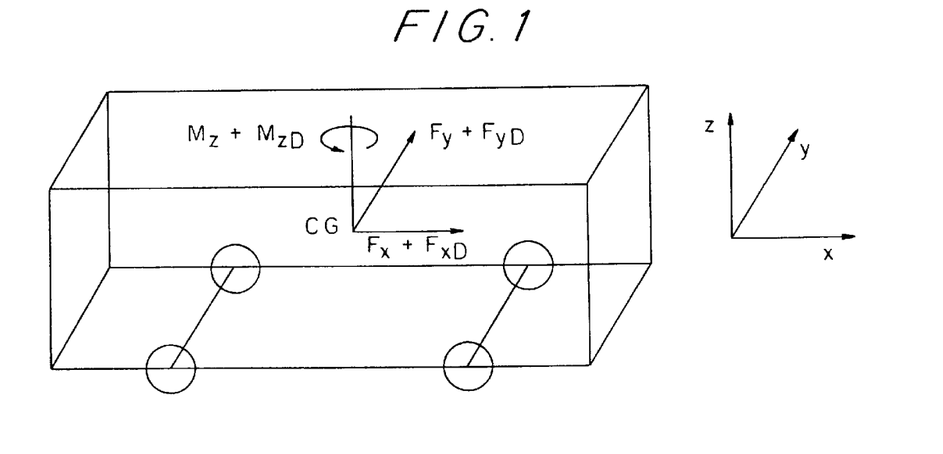
FIG. 1 shows the vehicle coordinates of a vehicle designed as a rigid body.

As can be seen in the schematic presentation in FIG. 1, a vehicle is considered as a rigid body with a mass m (in kg), whose main inertia axes are identical to the perpendicular coordinate axes x (forward), y (left) and z (up). In FIG. 1, CG denotes the center of gravity where the forces $F_x+F_{xD}$ act in the x-direction, and the forces $F_y+F_{yD}$ act in the y-direction. The torque around the z-axis through the center of gravity is marked with $M_z+M_{zD}$. The model is further simplified in that only the planar motion is considered with three degrees of freedom, i.e., a shifting in the x and y-direction, as well as a rotation around the z-axis. In other words, the pitch motion (rotation around the y-axis), the rolling motion (rotation around the x-axis) and the lift motion (shifting in z-direction) are not modeled dynamically. According to Newton and Euler, the following then applies:

$$m(\dot{v}_x - rv_y) = F_x + F_{xD} \quad (1)$$

$$m(\dot{v}_y - rv_x) = F_y + F_{yD} \quad (2)$$

$$J\dot{r} = M_z + M_{zD} \quad (3)$$

where $v_x$ and $v_y$ denote the velocity components (in m/s) in the x and y direction, respectively, and r denotes the yaw velocity (in radian/s) around the z-axis. J denotes the inertia moment (in kg m$^2$) around the z-axis through the center of gravity. The condition $v_x > 0$ is applied, i.e., only the forward movement of the vehicle is considered.

The forces which are significant for the steering dynamics occur between the tires and the road surface. In technical automobile literature, single-track models are therefore commonly derived by projecting the center of gravity CG onto the road surface and observing only the movement in the road plane.

Figure 2:
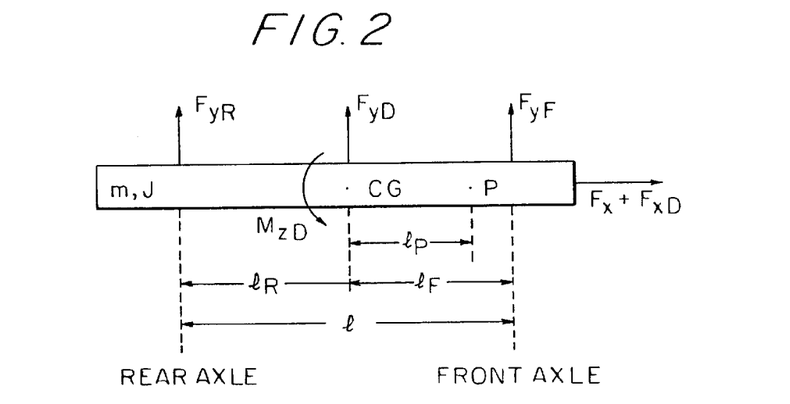
FIG. 2 is a schematic illustration of forces and moments occurring on the vehicle.

The forces acting in the road plane are shown in FIG. 2 in a top view, where $F_{yR}$ and $F_{yF}$ denote the axle sideforces in the rear (R) and in the front (F), respectively, and $F_y = F_{yR} + F_{yF}$ denotes the overall tire force in the y-direction. The parameter FYD includes all other sideforces, such as any side-wind and/or gravity component due to a sloped road surface. The sum of the tire forces in the x-direction is marked as $F_x$; these forces originate from the drive and brake. All other forces in the x-direction, such as the drag, a gravity component on hills, etc. are collectively denoted by $F_{xD}$. The torque around the vertical axis comprises the torque of the tire forces $M_z = F_{yF} l_F - F_{yR} l_R$ and disturbance torques $M_{zD}$ which may be caused, for example, by asymmetrical brake forces, a loss in tire pressure, a side-wind which does not act on the center of gravity, etc. One important objective of the driver support system is to minimize the effect of disturbance torques $M_{zD}$ on the yaw velocity r.

The most significant uncertainty in the model is presented by the tire forces. They can also fluctuate rather quickly, for example due to residual patches of ice on an otherwise dry road surface. The tire forces are dependent on the tire slip angles, and these in turn are dependent on the yaw velocity r and, in the front, on the front-wheel steering angle $\delta_F$. In the front, as will be shown later, it is possible to balance out the effect of the yaw velocity r with the aid of the front-wheel steering angle $\delta_F$. This is not possible for $F_{yR}$ without supplemental rear-wheel steering.

A robust decoupling of the effect of the yaw velocity r is thus only possible at a location at which the lateral acceleration is not dependent on $F_{yR}$. This location is determined by computing the lateral acceleration for an initially randomly selected point P at a distance $l_P$ in front of the center of gravity (see FIG. 2), as follows:

$$a_{yP} = a_y + l_P \dot{r}$$

$$= \frac{F_{yF} + F_{yR} + F_{yD}}{m} + l_P \frac{F_{yF} l_F - F_{yR} l_R + M_{zD}}{J}$$

$$= F_{yF}\left(\frac{1}{m} + \frac{l_P l_F}{J}\right) + F_{yR}\left(\frac{1}{m} - \frac{l_P l_R}{J}\right) + \frac{F_{yD}}{m} + \frac{M_{zD} l_P}{J}$$

The effect of $F_{yR}$ disappears exactly at the time when $$l_P = \frac{J}{m l_R} \quad (4)$$

is selected. The following therefore applies:

$$a_{yP} = F_{yF} \frac{l}{m l_R} + \frac{F_{yD}}{m} + \frac{M_{zD}}{m l_R} \quad (5)$$

The yaw velocity r only enters into $a_{yP}$ via the front axle sideforce $F_{yF}$. The objective of the robust decoupling has been met, i.e., nonobservability of the yaw velocity r from $a_{yP}$ is achieved if one succeeds in rendering the sideforce $F_{yF}$ independent from the yaw velocity r.

Figure 3:
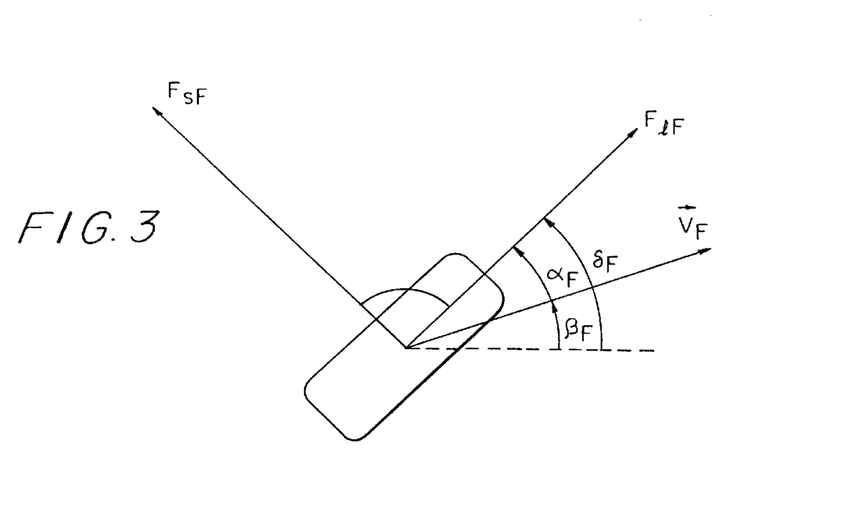
FIG. 3 is a schematic illustration of forces occurring at a front wheel with the respective angles.

As customary for the single-track model, the two front wheels are combined into one wheel in the center of the vehicle. FIG. 3 shows this wheel as well as forces and angles on the wheel. In FIG. 3, $F_{sF}$ denotes the wheel sideforce, which is a function of the tire slip angle $\alpha_F$ and about which very little is known. The longitudinal force of the tire, which is dependent on the brake, and in the case of a front-wheel drive also on the position of the accelerator pedal, is denoted with $F_{lF}$. The sideforce $F_{yF}$ at the front axle is thus $$F_{yF} = F_{sF}(\alpha_F) \cos \delta_F + F_{lF} \sin \delta_F$$

If small steering angles OF are assumed, the following applies as an approximation $$F_{yF} = F_{sF}(\alpha_F) \quad (6)$$

Within the frame of this approximation, the objective of decoupling the sideforce $F_{yF}$ from the yaw velocity r is met if one succeeds in rendering the tire slip angle $\alpha_F$ independent from the yaw velocity r. FIG. 3 illustrates this correlation:

$$\alpha_F = \delta_F - \beta_F \quad (7)$$

where $\beta_F$ denotes the chassis sideslip angle at the front axle.

Figure 4:
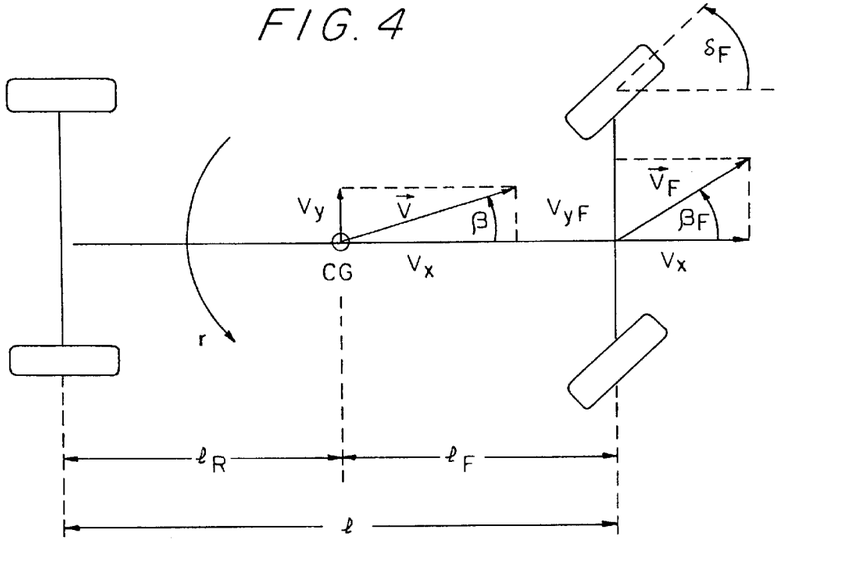
FIG. 4 is a schematic illustration of the various velocity vectors of a vehicle in motion, along with its variable angle.

FIG. 4 illustrates the correlation between the parameters used so far, i.e., the velocity vectors and the chassis sideslip angle, where the following applies:

$$\tan\beta_F = \frac{v_{yF}}{v_x} \quad (8)$$

with $v_{yF} = v_y + l_F r$.

To replace the unknown forces and the unknown mass in equations (1) and (2) with parameters which can be measured, these potential measurable parameters are first analyzed. The following measurements are available with inexpensive sensors:

1. The yaw velocity r, which is measured with a rotation rate sensor;
2. The driving speed $v_x$, which is obtained from ABS sensors;
3. The longitudinal acceleration $a_x = (F_x + F_{xD})/m$;
4. The lateral acceleration $a_y$ as, for example as $a_y = (F_y + F_{yD})/m$ at the center of gravity CG. The lateral acceleration can be calculated at any selected location through interpolation between the measurements from two transversal accelerometers in the front and rear;
5. The steering wheel angle, which may be obtained, for example, with a potentiometer or a capacitative sensor.

Measuring the velocity component in the y-direction, i.e. $v_y$ at the center of gravity or $v_{yF}$ at the front axle presents a complex task; the same applies to the front chassis sideslip angle $\beta_F$. which is related with the velocity components by equation (8). The front chassis sideslip angle $\beta_F$ can only approximately be reconstructed from the measurements 1 to 5 above. This is accomplished by a computational procedure, which is known in the systems theory literature under the name "observer" (See for example T. Kailath, Linear Systems, Prentice Hall, 1980). The observer theory has been applied in the present context of reconstruction of $\beta_F$ by van Zanten et al. (See indicated location)

The uncertain parameters m, $F_x$, $F_{xD}$, $F_y$ and $F_{yD}$ in equations (1) and (2) are now replaced with the measurable accelerations.

$$\dot{v}_x = a_x + r v_y \quad (9)$$

$$\dot{v}_y = a_y - r v_x \quad (10)$$

To derive the control law that renders the tire slip angle $\alpha_F$ independent from the yaw velocity r, both sides of the equation (8) are differentiated:

$$\frac{\dot{\beta}_F}{\cos^2 \beta_F} = \frac{\dot{v}_{yF} v_x - v_{yF} \dot{v}_x}{v_x^2} \quad (11)$$

With $\dot{v}_{yF} = \dot{v}_y + l_F \dot{r}$, the following applies in the above equation: $\dot{v}_{yF} = \dot{v} l_F \dot{r}$. The velocities $\dot{v}_x$ and $\dot{v}_y$ are entered according to the equations (9) and (10).

$$\frac{\dot{\beta}_F}{\cos^2 \beta_F} = \frac{a_y v_x - r v_x^2 + l_F \dot{r} v_x - v_{yF}(a_x + r v_y)}{v_x^2} \quad (12)$$

To be able to make simplifications in the chassis sideslip angle $\beta_F$, the last numerator member is written as $rv_y = r(v_y + l_F r - l_F r) = r(v_{yF} - l_F r)$. With equation (8) and $\tan\beta_F = \sin\beta_F / \cos\beta_F$, equation (12) becomes $$\dot{\beta}_F = \frac{\cos^2 \beta_F}{v_x^2}(a_y v_x - r v_x^2 + l_F \dot{r} v_x - v_{yF} a_x - v_{yF}^2 r + v_{yF} l_F r^2)$$

$$= \cos^2 \beta_F \left( \frac{a_y}{v_x} - r + \frac{l_F \dot{r}}{v_x} - \frac{a_x}{v_x} \tan\beta_F - r \tan^2 \beta_F + \frac{l_F r^2}{v_x} \tan\beta_F \right)$$

$$= -r(\cos^2 \beta_F + \sin^2 \beta_F) + \frac{\cos\beta_F}{v_x}[(a_y + l_F \dot{r})\cos\beta_F + (l_F r^2 - a_x)\sin\beta_F]$$

$$= -r + \frac{\cos\beta_F}{v_x}[(a_y + l_F \dot{r})\cos\beta_F + (l_F r^2 - a_x)\sin\beta_F]$$

Lastly, the lateral acceleration $a_{yP}$ to be decoupled is introduced with $a_y = a_{yP} - l_P \dot{r}$:

$$\dot{\beta}_F = -r + \frac{\cos\beta_F}{v_x}[(a_{yP} + (l_F - l_P)\dot{r})\cos\beta_F + (l_F r^2 - a_x)\sin\beta_F] \quad (13)$$

From equation (7) now results the differential equation for the frontal tire slip angle $\alpha_F$:

$$\dot{\alpha}_F = \dot{\delta}_F - \dot{\beta}_F = \quad (14)$$

$$\dot{\delta}_F + r - \frac{\cos\beta_F}{v_x}[(a_{yP} + (l_F - l_P)\dot{r})\cos\beta_F + (l_F r^2 - a_x)\sin\beta_F]$$

According to equations (5) and (6), the lateral acceleration $a_{yP}$ is dependent on the yaw velocity r only through the tire slip angle $\alpha_F$, but it is not directly dependent on the yaw velocity r. The members which depend on the yaw velocity r can be balanced out with an appropriately selected differential equation for the feedback.

$$\dot{\delta}_F = -r + \frac{\cos\beta_F}{v_x}[(l_F - l_P)\dot{r}\cos\beta_F + (l_F r^2 - a_x)\sin\beta_F] \quad (15)$$

To prevent a division by zero, a controller used for this purpose is switched on, shock-free, only after a minimum speed $v_{xmin}$ has been reached. Equation (15) thus also applies for $v_x > v_{xmin}$ and only describes the feedback loop of the controller. The intervention from the steering wheel angle will be added later. Based on the selection of the controller according to equation (15), equation (14) is now simplified as follows $$\dot{\alpha}_F = -\frac{\cos^2\beta_F}{v_x} a_{yP}(\alpha_F) \quad (16)$$

A realistic frontal chassis sideslip angle $\beta_F$ with $|\beta_F|<13°$ yields $0.95<\cos\beta_F<1$, so that $\cos^2\beta_F \approx 1$; i.e., the dependence of the chassis sideslip angle $\beta_F$ on the yaw velocity r only plays a secondary role. For the frontal tire slip angle $\alpha_F$, which is decoupled from the yaw velocity r, the following differential equation of first order is then obtained with the equations (5) and (6):

$$\dot{\alpha}_F = -\frac{1}{v_x}\left[F_{sF}(\alpha_F)\frac{l}{ml_R} + \frac{F_{yD}}{m} + \frac{M_{zD}}{ml_R}\right] \quad (17)$$

For this system to be stable, only the condition $\alpha_F F_{sF}(\alpha_F)>0$ must be met, i.e., the characteristic tire curve $F_{sF}(\alpha_F)$ must only extend through the first and third quadrant. This condition is fulfilled in practice.

The feedback law according to equation (15) represents a generalization of the control law in DE 40 28 320:

$$\dot{\delta}_F = -r \quad (18)$$

Figure 7:
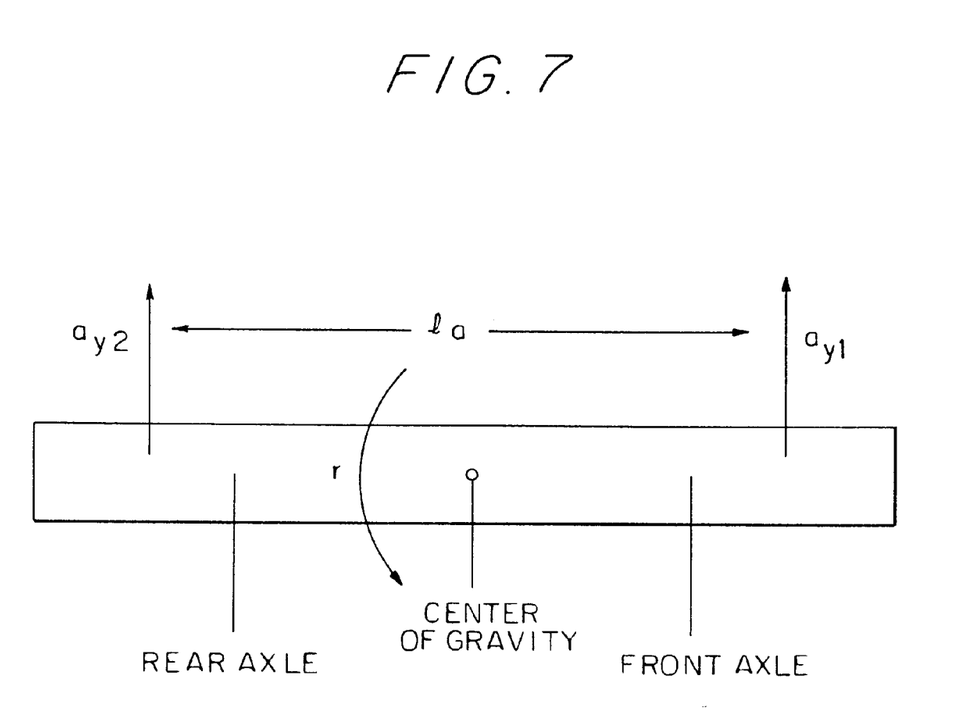

Said control law was derived under the assumption of an ideal mass distribution $l_F=l_P$. Furthermore, the member $(l_F r^2-a_x)\cos\beta_F \sin\beta_F/v_x$ was neglected there. With the expanded control law according to equation (15), the effect of accelerations and decelerations on the robust unilateral decoupling can be balanced out. However, this makes it necessary to measure the acceleration $a_x$ and the driving speed $v_x$. The front chassis sideslip angle $\beta_F$, if it cannot be measured, is approximately reconstructed in an observer, as described above. The yaw acceleration $\dot{r}$ is obtained either by differentiation of the yaw angle r or from the measurements of two lateral accelerometers mounted in convenient locations in a horizontal distance $l_a$ from each other. (See FIG. 7). The following then applies:

$$\dot{r} = \frac{a_{y1} - a_{y2}}{l_a} \quad (19)$$

The feedback law according to equation (15) is now expanded by including the active steering $\delta_L$ by the driver and two input variables $u_1$ and $u_2$ for supplemental feedbacks which will be discussed later on. In this context, $\delta_L$ already represents the steering angle translated to the respective front-wheel steering angle based on the steering gear ratio. The following control law is then obtained:

$$\delta_F = \delta_L + (F_1\delta_L) + \dot{\delta}_I + u_1 \quad (20)$$

$$\dot{\delta}_I = (F_2\delta_L) - r + \frac{\cos\beta_F}{v_x}[(l_F - l_P)\dot{r}\cos\beta_F + (l_F r^2 - a_x)\sin\beta_F] + u_2$$

The first line in equation (20) describes that an additional angle $$\delta_C = (F_1\delta_L) + \dot{\delta}_I + u_1 \quad (21)$$

which is calculated in the controller, is added to the conventional steering $\delta_F = \delta_L$. In a "steer-by-wire" system, the addition $\delta_F = \delta_L + \delta_C$ is performed by the microprocessor and a steering motor is actuated for $\delta_F$ (see J. Ackermann et al, as mentioned above). For safety reasons it is preferable to leave the mechanical connection from the steering wheel to the front wheels in place and only add the supplemental steering angle $\delta_C$ mechanically via a steering motor. This may be effected in the rotational movement of the steering column, for example by means of a sun-and-planet-gear, or in a linear shifting in the rack and pinion. If the supplemental angle $\delta_C$ is mechanically limited as $|\delta_C| \leq \delta_{Cmax}$ for safety reasons, it must be ensured that the supplemental angle $\delta_C$ moves to the limit stop only briefly, if at all, but does not remain there. The integration of the $\dot{\delta}_1$, obtained from measured values, to $\delta_I$ is performed by the microprocessor of the controller.

$(F_1 \delta_L)$ and $(F_2 \delta_L)$ are signals which are modified by prefilters and dependent on the steering wheel angle $\delta_L$. For $\delta_L \equiv 0$, $u_1 \equiv 0$ and $u_2 \equiv 0$ the equations (15) and (20) are the same.

The parameter $(F_1 \delta_L)$ affects the response characteristics of the steering, i.e. the immediate response to a sudden steering wheel movement. In the stationary behavior, $(F_1 \delta_L)$ should have no effect. In the linear prefilter $F_1(s)$ a derivative-action steering can be implemented, with an approximation, for example with $$F_1(s) = k_1 s \quad (22)$$

The prefilter $F_2(s,v_x)$ controls the stationary parameter value $r_{stat}$ of the yaw velocity r, which establishes itself in response to a sudden steering wheel angle change after a transient effect during steady-state cornering. Its gain should therefore correspond to the steady-state gain of the steering wheel angle $\delta_L$ to the yaw acceleration r of the conventional vehicle. This is the case for $$F_2(0, v_x) = \frac{r_{stat}}{\delta_{Lstat}} = \frac{v_x}{l[1 + (v_x/v_{CH})^2]} \quad (23)$$

where $v_{CH}$ is the "characteristic speed".
For example, $$F_2(s, v_x) = \frac{v_x}{l[1 + (v_x/v_{CH})^2]} \frac{1}{1 + T_2(v_x)s} \quad (24)$$

can be determined empirically so that the yaw movement is actuated as gently as possible during the steering process via a low pass of first order with a velocity-dependent time constant $T_2(v_x)$. (See J. Ackermann and T. Bünte, "Handling improvement for robustly decoupled car steering dynamics", Proc. 4th IEEE Mediterranean Conference on Control and Automation, Crete, pages 83–88, 1996). The favorable setting of the prefilters $F_1$ and $F_2$ optionally in dependence on $v_x$ and $|\delta_L|$, lastly also depends on the subjective perception of the driver and can therefore not be analytically derived here.

With the expansion of the control law according to equation (20), equation (16) thus becomes:

$$\dot{\alpha}_F = -\frac{\cos^2\beta_F}{v_x}a_{yP}(\alpha_F) + \dot{\delta}_L + (F_1\dot{\delta}_L) + (F_2\delta_L) + \dot{u}_1 + u_2 \quad (25)$$

The signals which depend on the steering wheel angle $\delta_F$ are combined into one signal:

$$\dot{\delta} = \dot{\delta}_L + (F_1\dot{\delta}_L) + (F_2\delta_L) \quad (26)$$

Figure 5:
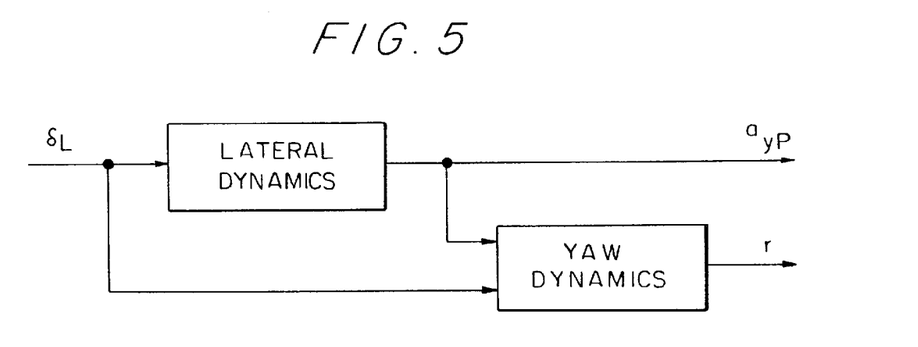
FIG. 5 is the schematic illustration of a direction of action between unilaterally decoupled partial systems.

The dynamics occurring in a controlled vehicle are illustrated in FIG. 5. The lateral dynamics with the variable of state $\alpha_F$ are described by the differential equation (17) of order one. (The external disturbance parameters $F_{yD}$ and $M_{zD}$ are not shown in FIG. 5). The yaw dynamics with the variables of state r according to equation (3), and $\delta_1$ according to equation (20) are of order two. (To be precise, a slight coupling to the differential equation (1) for $v_x$ remains because of the decelerating effect of the steering). FIG. 5 illustrates the result, i.e., nonobservability of the parameter r from $a_{yP}$ (which, in turn, is directly linked to the tire slip angle $\alpha_F$). This characteristic is robust with respect to unknown forces between the tires and the road. A measurement and controller adaptation with $v_x$ furthermore make it robust with respect to added loads in the vehicle, as long as the ratio $J=ml_Rl_P$ remains unchanged.

For other load distributions, for example a heavy load in the rear of a light station wagon, $l_P$ should appropriately be determined in the controller. According to equation (4), the length $l_P$ is only dependent on the load distribution of the vehicle, but not on the road adhesion of the tires and on the speed. Changes in the length $l_P$ therefore do not occur during driving (aside from changes in the mass m and the inertia moment J due to the gasoline consumption); the distance $l_P$ from the center of gravity only needs to be readjusted prior to the road trip based on the current vehicle load. Based on the nominal initial setting $m_0$, $J_0$, $l_{P0}=J_0/m_0l_{R0}$ for the vehicle and driver, an additional load $m_L$ at a distance $l_L$ in front of the nominal center of gravity results in a change of the location of the center of gravity from $l_R$ to $l_{R0}+d$ with $d=m_Ll_L/(m_0+m_L)$ and, according to Steiner's theorem, an inertia moment with respect to the new location of the center of gravity of $$J=m_0J_{R0}l_{r0}+m_L(l_L-d)^2+m_0d^2 \qquad (27)$$

This means that $l_P=J/ml_P$ can be computed and adjusted in the controller. The added load $m_L$ and its position $l_L$ may be determined prior to the road trip, for example statically from the deflections of the vehicle suspension.

With the robust unilateral decoupling, a clean separation of the above-listed problems to be solved by the driver, i.e. the "directional control" and the "yaw stabilization" has been accomplished in the sense that the driver of a controlled vehicle is only left with the simplified task of performing the directional control via the lateral acceleration $a_{yP}$, while the control system automatically regulates the yaw movement. With this ideal decoupling of the two partial systems as the starting point, the objective is now to improve their dynamics individually—with as few compromises as possible regarding the ideal decoupling. For the partial system of the lateral dynamics, the objective is to achieve a swift vehicle response to steering commands; for the yaw dynamics, the objective is an improved damping at high speed driving.

Lastly, for the overall system including the driver, the objective is to only implement the automatic steering intervention briefly after the occurrence of a yaw disturbance moment or a steering movement, to bridge the driver's response time, but then quickly turn over full steering control to the driver, so that he receives quick support on one hand but does not have to undergo a re-learning process for normal driving, on the other hand.

The two unilaterally decoupled systems are evaluated based on a simplified linear model. For this purpose the external disturbance parameters $F_{yD}$ and $M_{zD}$ are set to zero since they do not have any influence on the eigenvalues of the linearized lateral and yaw dynamics. Furthermore, small variable angles $\beta_F$ are assumed, i.e. $\cos^2 \beta_F=1$, and the characteristic tire curves are linearized with the aid of the cornering stiffness in the front ($c_F$) and the rear ($c_R$), i.e., $$F_{sF}(\alpha_F)=c_F\alpha_F, F_{sR}=c_R\alpha_R \qquad (28)$$

With equations (5) and (6) the following thus applies $$a_{yP} = \frac{c_Fl}{ml_R}\alpha_F \qquad (29)$$

and equations (25) and (26) become $$\dot{\alpha}_F = -\frac{1}{v_x}a_{yP}(\alpha_F) + \dot{\delta} + \dot{u}_1 + u_2 \qquad (30)$$

Insertion of equation (29) produces $$\dot{\alpha}_F = -\frac{c_Fl}{ml_Rv_x}\alpha_F + \dot{\delta} + \dot{u}_1 + u_2 \qquad (31)$$

and in the Laplace domain:

$$\left(s + \frac{c_Fl}{ml_Rv_x}\right)\alpha_F(s) = s\delta(s) + su_1(s) + u_2(s) \qquad (32)$$

With the abbrevation $$b=c_Fl/ml_R \qquad (33)$$

the following results $$(s + b/v_x)\alpha_F(s) = s\delta(s) + su_1(s) + u_2(s) \qquad (34)$$

$$\alpha_F(s) = \frac{1}{s+b/v_x}[s\delta(s) + su_1(s) + u_2(s)] \qquad (35)$$

$$a_{yP}(s) = b\alpha_F(s) \qquad (36)$$

$$a_{yP}(s) = \frac{b}{s+b/v_x}[s\delta(s) + su_1(s) + u_2(s)] \qquad (37)$$

Equation (37) describes the partial system marked "lateral dynamics" in FIG. 5. It is stable during the forward movement of the vehicle ($v_x>0$) with a real eigenvalue at $-b/v_x$.

The partial system "yaw dynamics" is composed of the differential equation (3) for the yaw velocity r and the differential controller equation (20) with the added parameter $\delta_1$. The latter is linearised with $(l_Fr^2-a_x)\cos\beta_F\sin\beta_F/v_x=0$ by neglecting acceleration processes, and the velocity component $v_x$ is assumed to be constant. This means that $$\delta_F = \delta_L + (F_1\delta_L) + \delta_I + u_1 \qquad (38)$$

$$\dot{\delta}_I = (F_2\delta_L) - r + \frac{l_F - l_P}{v_x}\dot{r} + u_2$$

or, in the Laplace domain with assumed linear prefilters $F_1(s)$ and $F_2(s)$ $$s\delta_F(s) = [s + sF_1(s) + F_2(s)]\delta_L(s) + \qquad (39)$$

-continued
$$\left(-1+\frac{l_F-l_P}{v_x}s\right)r(s)+su_1(s)+u_2(s)$$

and in the summarizing notation of equation (26), this results in $$s\delta_F(s)=-\left(1-\frac{l_F-l_P}{v_x}s\right)r(s)+s\delta(s)+su_1(s)+u_2(s) \quad (40)$$

To this is added the linearized and disturbance-free version of equation (3) as $$J\dot{r}=M_z$$

$$ml_Rl_P\dot{r}=l_Fc_F\alpha_F-l_Rc_R\alpha_R \quad (41)$$

The rear tire slip angle $\alpha_R$ is $$\alpha_R=-\beta_R=-\beta_F+\frac{l}{v_x}r$$

and with equation (7)

$$\alpha_R=\alpha_F-\delta_F+\frac{l}{v_x}r \quad (42)$$

so that equation (41) in the Laplace domain becomes $$ml_Rl_Psr(s)=-(l_Rc_R-l_Fc_F)\alpha_F(s)+l_Rc_R\delta_F(s)-\frac{ll_Rc_R}{v_x}r(s)$$

This equation is multiplied with s on both sides, and $s\delta_F(s)$ is entered according to equation (40)

$$ml_Rl_Ps^2r(s)=-(l_Rc_R-l_Fc_F)s\alpha_F(s)-$$
$$l_Rc_R\left(1-\frac{l_F-l_P}{v_x}s\right)r(s)+l_Rc_R[s\delta(s)+su_1(s)+u_2(s)]-\frac{ll_Rc_R}{v_x}sr(s)$$

where $l=l_R+l_F$ $$\left[ml_Rl_Ps^2+\frac{l_Rc_R}{v_x}(l_R+l_P)s+l_Rc_R\right]r(s)=$$
$$-(l_Rc_R-l_Fc_F)s\alpha_F(s)+l_Rc_R[s\delta(s)+su_1(s)+u_2(s)]$$

The division of both sides by $l_Rc_R$ leads to $$\left[\frac{ml_P}{c_R}s^2+\frac{l_R+l_P}{v_x}s+1\right]r(s)= \quad (43)$$
$$\left(-1+\frac{l_Fc_F}{l_Rc_R}\right)s\alpha_F(s)+s\delta(s)+su_1(s)+u_2(s)$$

With the abbreviations $a_2=ml_P/c_R$, $a_1=(l_R+l_P)/v_x$ and $c=l_Fc_F/l_Rc_R$, the following results from equation (43):

$$(1+a_1s+a_2s^2)r(s)=(-1+c)s\alpha_F(s)+s\delta(s)+su_1(s)+u_2(s) \quad (44)$$

-continued
$$r(s)=\frac{(-1+c)s}{1+a_1s+a_2s^2}\alpha_F(s)+\frac{1}{1+a_1s+a_2s^2}[s\delta(s)+su_1(s)+u_2(s)] \quad (45)$$

and with $\alpha_F(s)$ according to equation (34):

$$r(s)=\frac{s(cs+b/v_x)}{(1+a_1s+a_2s^2)(s+b/v_x)}[\delta(s)+u_1(s)+u_2(s)/s] \quad (46)$$

Figure 6:
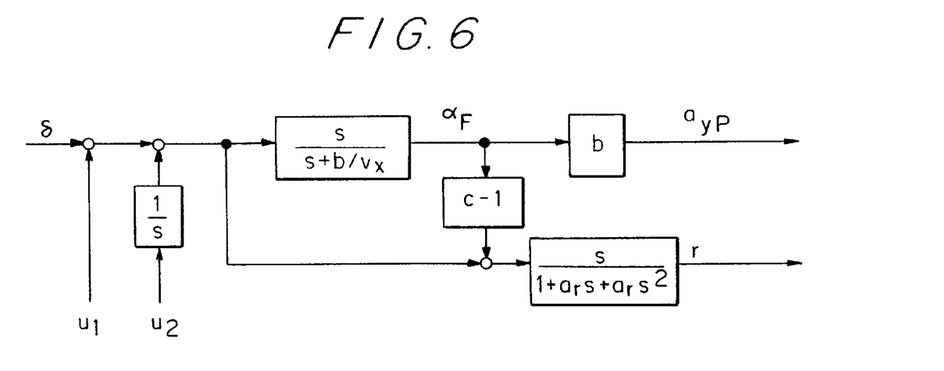
FIG. 6 is a linearized illustration of directions of action between the unilaterally decoupled partial systems, and FIG. 7 a schematic illustration of the convenient locations of two lateral accelerometers.

The connection of the two linearized partial systems (35) and (45) is shown in FIG. 6.

The eigenvalue of the lateral dynamics according to equation (37) lies at $s=-b/v_x=-c_Fl/ml_Rv_x$. It may be desirable to accelerate its dynamics, i.e. to shift the eigenvalue further to the left. Since the robust decoupling has rendered the lateral dynamics independent from the yaw dynamics, they can be accelerated through feedback of $a_{yP}$ to u within the limitations of the steering motor, without any resulting effect on the yaw dynamics.

The following feedback is thus used:

$$u_2(s)=k_Q[v_xF_2(s)\delta_L(s)-a_{yP}(s)] \quad (47)$$

Together with equation (37) this results in:

$$a_{yP}(s)=\frac{b}{s+b/v_x}[s\delta(s)+su_1(s)+k_Q(v_xF_2(s)\delta_L(s)-a_{yP}(s))] \quad (48)$$

$$a_{yP}(s)\left[s+b\left(\frac{1}{v_x}+k_Q\right)\right]=b[s\delta(s)+su_1(s)+k_Qv_xF_2(s)\delta_L(s)]$$

In dependence on the selection of the controller parameter $k_Q$, the eigenvalue is as follows $$s_Q=-b\left(\frac{1}{v_x}+k_Q\right)=-\frac{c_Fl}{ml_R}\left(\frac{1}{v_x}+k_Q\right) \quad (49)$$

In DE 43 07 420, for example, a controller $$k_Q(v_x)=-\frac{1}{v_x}+k_P \quad (50)$$

which is continuously adapted to the velocity $v_x$ was used to achieve velocity-independent lateral dynamics with the eigenvalue $$s_Q=-c_Fl\,k_P/ml_R \quad (51)$$

It can only be switched on after a minimum velocity $v_{xmin}$ has been reached, i.e. for $v_x \geq v_{min}$.

In the linearized of the second partial system "yaw damping" according to FIG. 6, the natural frequency $\omega_{dec}$ may be determined in the yaw damping $D_{dec}$ of the decoupled system by equating $$1+a_1s+a_2s^2=1+\frac{2D_{dec}}{\omega_{dec}}s+\frac{1}{\omega_{dec}^2}s^2 \quad (52)$$

to produce $$\omega_{dec} = \sqrt{\frac{1}{a_2}} = \sqrt{\frac{c_R}{ml_P}} \tag{53}$$

$$D_{dec} = \frac{\omega_{dec} a_1}{2} = \frac{l_R + l_P}{2v_x}\sqrt{\frac{c_R}{ml_P}} \tag{54}$$

The values for the ideal mass distribution $l_P = l_F$ have already been derived and it was shown that the damping of the unilaterally decoupled vehicle is lower for high speeds $v_x$ than that of the conventional vehicle, which may result in an insufficient yaw stability.

To solve this difficulty, a compromise presents itself in the form that the advantages of the ideal decoupling are fully utilized up to a speed $v_{xE}$, while a feedback from r to us or u2 is gently switched on for $v_x > v_{xE}$, which somewhat impacts the decoupling but results in a specific improvement of the yaw damping. Implementation of this feedback in a general form would result in the destruction of the robust factorization of the characteristic polynomial in $(s+b/v_x)$ $(1+a_1s+a_2s^2)$ achieved by the decoupling, so that the yaw damping could only be determined numerically for numerically established vehicle data. The feedback is thus implemented in a manner so that it reduces the member $s+b/v_x$. For the sake of simplicity, it is assumed that the yaw dynamics remain unchanged, i.e., $k_Q=0$.

For the cancellation the member $b=c_Fl/ml_R$ uncertain. During the reducing, the most unfavorable case of a slippery road (small $c_F$) and a full load (a large mass m) was assumed. For this case the shortening is then exact while the zero position remains unchanged for more favorable conditions but the pole shifts to the left resulting in a small, in effect desirable, phase lead. The following is based on the assumption of an exact substitution. The velocity $v_x$, for example, can be measured with the help of the ABS sensors and used for the gain adaptation in the controller.

A member $(s+b/v_x)r(s)$, or $\dot{r}(t)+b/v_x r(t)$ in the time domain, can be generated with the help of the yaw rate sensor for the yaw velocity r and two lateral accelerometers according to equation (19). It can be fed back to $u_1(t)$ or $u_2(t)$, respectively, via a velocity-dependent feedback. Lastly, to render the two accelerometers unnecessary, it can also be generated with a combination of the two inputs $u_1$ and $u_2$. All three alternatives are analyzed below.

a) Feedback to us $$u_1 = -k_{D1}(s+b/v_x)r(s) \tag{55}$$

Insertion in equation (34) with $u_2(s)=0$ produces $$(s+b/v_x)\alpha_F(s) = s\delta(s) - k_{D1}(s+b/v_x)sr(s)$$

This expression for $\alpha_F(s)$ as well as $u_1$ according to equation (55) is entered into equation (44):

$$(1 + a_1s + a_2s^2)r(s) = (-1+c)\frac{s^2}{s+b/v_x}\delta(s) - \tag{56}$$

$$(-1+c)k_{D1}s^2r(s) + s\delta(s) - k_{D1}(s+b/v_x)sr(s)$$

$$[1 + (a_1 + k_{D1}b/v_x)s + (a_2 + ck_{D1})s^2]r(s) = \frac{s(cs+b/v_x)}{s+b/v_x}\delta(s) \tag{57}$$

The natural frequency and damping are determined from $$1 + (a_1 + k_{D1}b/v_x)s + (a_2 + ck_{D1})s^2 = 1 + \frac{2D_1}{\omega_1}s + \frac{1}{\omega_1^2}s^2 \tag{58}$$

$$\omega_1^2 = \frac{1}{a_2 + ck_{D1}} \tag{59}$$

$$D_1^2 = \frac{(a_1 + k_{D1}b/v_x)^2}{4(a_2 + ck_{D1})} \tag{60}$$

$D_1^2$ has a double zero position for $k_{D1} = -a_1v_x/b > 0$. For larger values of $k_{D1}$, $D_1^2$, grows; reaches the value $D_1^2 = a_1^2/4a_2$ for $k_{D1}=0$ (which corresponds to $D_{dec}$ according to equation (53)), and increases towards infinity, in linearity with $k_{D1}$, for larger values of $k_{D1}$. With $k_{D1}>0$, however, any desired improved yaw damping may be established.

b) Feedback to $u_2$ $$u_2 = -k_{D2}(s+b/v_x)r(s) \tag{61}$$

As in equation (56), the following is obtained:

$$(1 + a_1s + a_2s^2)r(s) = (-1+c)\frac{s^2}{s+b/v_x}\delta(s) - \tag{62}$$

$$(-1+c)k_{D2}sr(s) + s\delta(s) - k_{D2}(s+b/v_x)r(s)$$

$$[(1 + k_{D2}b/v_x) + (a_1 + ck_{D2})s + a_2s^2]r(s) = \frac{s(cs+b/v_x)}{s+b/v_x}\delta(s)$$

After a division by $1+k_{D2}b/v_x$, $\omega_2$ and $D_2$ are obtained from:

$$1 + \frac{a_1 + ck_{D2}}{1 + k_{D2}b/v_x}s + \frac{a_2}{1 + k_{D2}b/v_x}s^2 = 1 + \frac{2D_2}{\omega_2}s + \frac{1}{\omega_2^2}s^2 \tag{63}$$

$$\omega_2^2 = \frac{1 + k_{D2}b/v_x}{a_2} \tag{64}$$

$$D_2^2 = \frac{(a_1 + ck_{D2})^2}{4a_2(1 + k_{D2}b/v_x)} \tag{65}$$

Again, the value $D_2^2 = a_1^2/4a_2$ of the decoupled system is attained for $k_{D2}=0$. For large $k_{D2}$, $D_2^2$ increases towards infinity, in linearity with $k_{D2}$. Again, any desired improved yaw damping can be established with $D_{K2}>0$ c) Feedback to $u_1$ and $u_2$ $$u_1(s) = -k_{D3}r(s) \tag{66}$$

$$u_2(s) = -k_{D3}\frac{b}{v_x}r(s)$$

Insertion into equation (34) produces:

$$(s+b/v_x)\alpha_F(s) = s\delta(s) - k_{D3}(s+b/v_x)r(s)$$

The parameter $\alpha_F(s)$ is entered together with equations (66) and (44)

$$(1 + a_1s + a_2s^2)r(s) = \tag{67}$$

$$\frac{(-1+c)}{s+b/v_x}s^2\delta(s) - k_{D3}(-1+c)sr(s) + s\delta(s) - k_{D3}(s+b/v_x)r(s)$$

$$[(1 + k_{D3}b/v_x) + (a_1 + ck_{D3})s + a_2s^2]r(s) = \frac{s(cs+b/v_x)}{s+b/v_x}\delta(s)$$

This expression corresponds to equation (62), so that the same natural frequency $\omega_3 = \omega_2$ and the same damping $D_3=D_2$ result. However, the controller according to equation (66) has the practical advantage that only the parameter r(t) is required for the feedback and it is not necessary to determine $\dot{r}$ (t) from measurements with two accelerometers.

Feedback to $u_1$ according to version a) reduces the natural frequency $\omega_1$ as the yaw damping is increased. In contrast feedback according to the versions b) and c) increases the natural frequency $\omega_2$. Insertion of $a_1$, $a_2$, b and c, results in the clampings as follows:

$$D_1^2 = \frac{\left(\frac{l_R+l_P}{v_x} + k_{D1}\frac{c_Fl}{ml_Rv_x}\right)^2}{4\left(\frac{ml_P}{c_R} + \frac{l_Fc_F}{l_Rc_R}k_{D1}\right)} = \frac{c_R[(l_R+l_P)ml_R + k_{D1}c_Fl]^2}{4v_x^2m^2l_R^2\left(ml_P + \frac{l_Fc_F}{l_R}k_{D1}\right)} \quad (68)$$

$$D_2^2 = \frac{\left(\frac{l_R+l_P}{v_x} + \frac{l_Fc_F}{l_Rc_R}k_{D2}\right)^2}{4\frac{ml_P}{c_R}\left(1 + k_{D2}\frac{c_Fl}{ml_Rv_x}\right)} = \frac{c_Rl_R\left(l_R+l_P + \frac{l_Fc_F}{l_Rc_R}k_{D2}v_x\right)^2}{4v_xl_P(ml_Rv_x + k_{D2}c_Fl)} \quad (69)$$

In both cases a desired velocity-dependence of the damping $D_1^2$ ($v_x$) or $D_2^2$ ($v_x$), respectively, may be stipulated and the respective quadratic equation can be solved for $k_{D1}(v_x)$ or $k_{D2}(v_x)$.

For low and medium velocities, $k_{D1}$, and $k_{D2}$, respectively, are set to zero to achieve the ideal decoupling; at $v_x=v_{xE}$, $k_{D1}$, or $k_{D2}$, respectively, then grows from zero to positive values.

$$k_{Di} = \begin{cases} 0 & \text{für } v_x < v_{xE} \\ k_{Di}(v_x) \geq 0 & \text{für } v_x \geq v_{xE} \end{cases} \quad (70)$$

with $k_{Di}(v_{xE})=0$

In the controller according to equation (20), an angle $\delta_C$ which is calculated by the computer, is added via a steering motor to the conventional steering command $\delta_L$. The correction angle $\delta_C$ is designed to provide swift driver support during unexpected yaw movements. During steady-state straight-ahead driving or cornering, however, the angle $\delta_C$ should decrease back to zero so that, at $\delta_F=\delta_L$, the driver senses the steady-state behavior of the vehicle which he is used to. For this purpose the integrator 1/s was replaced in the controller according to equation (20) with a so-called "short-term integrator" with the transfer equation $$KI(s) = \frac{s}{s^2 + d_1s + d_0} \quad (71)$$

whose parameters $d_0$ and $d_1$ have been selected so that the jump response only behaves similar to an integrator for 0.5 to 1 second but then returns well-damped to zero. This version, too, can be combined with the generalized controller according to equation (20).

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . ." and "means for . . ." as may be found in the specification above and/or in the claims below, followed by a functional statement, are intended to define and cover whatever structural, physical, chemical or electrical element or structure may now or in the future exist carries out the recited function, whether or not precisely equivalent to the embodiment or embodiments disclosed in the specification above; and it is intended that such expressions be given their broadest interpretation.

What is claimed is:

1. A method for automatically correcting steering of a road vehicle by a driver, the driver controlling a steering wheel of the vehicle by an angle $\delta_H$ (in radian), the vehicle having a wheelbase l(in m), a center of gravity (CG) disposed a distance $l_F$ (in m) from the front axle and a distance $l_R$(in m) from the rear axle, a mass m (in kg), a moment of inertia J (in kg m$^3$) around a vertical axis through the center of gravity, and a steering gear ratio $i_L$; the method comprising:

providing a controller and sensors;

measuring a yaw velocity r (in radian/s) around the vertical axis with the yaw rate sensor;

determining a driving speed $v_x$(in m/s) via the ABS sensor;

measuring an acceleration $a_x$(in m/s$^2$) in the driving direction with an accelerometer;

measuring a lateral acceleration, the acceleration being counted as positive to the left, with two accelerometers mounted at two convenient locations at a distance $l_a$ in the longitudinal vehicle direction as $a_{y1}$, (in m/s$^2$, front) and $a_{y2}$ (m/s$^2$, rear);

measuring a steering wheel angle $\delta_H$ with a potentiometer or a capacitive sensor on a steering column of the vehicle, the angle being measured in radians counting positive to the left;

computing a vehicle wheel angle $\delta_L=\delta_H/i_L$ controlled by the driver;

computing a variable angle $\beta_F$ at the front axle according to a the known observer method; and computing in a microprocessor of the controller according to the differential equation $$z = F_2(\delta_L) - r + \frac{\cos\beta_F}{v_x}\left[(l_F - l_P)\frac{a_{y1} - a_{y2}}{l_a}\cos\beta_F + (l_Fr^2 - a_x)\sin\beta_F\right] + u_2$$

$$\frac{d^2}{dt^2}\delta_1 + d_1\frac{d}{dt}\delta_1 + d_0\delta_1 = \frac{d}{dt}z$$

$$\delta_C = F_1(\delta_L) + \delta_1 + u_1$$

$$\delta_L = \frac{\delta_H}{i_L}; l_P = \frac{J}{ml_R}$$

$$u_1 = 0, u_2 = 0$$

$$d_1 = 0, d_0 = 0$$

where $\delta_C$ denotes a supplemental steering angle which, when added to the vehicle wheel angle $\delta_L$ controlled by the driver results in the overall wheel angle $\delta_F=\delta_L+\delta_C$; where $\delta_1$, denotes a computer-internal controller state; where $u_1$ denotes a first input for further feedback signals and $u_2$ denotes a second input for further feedback signals; and where $F_1(\delta_L)$ and $F_2(\delta_L)$ denote prefilters which are functions of the vehicle wheel angle $\delta_L$.

2. The method according to claim 1, wherein the supplemental steering angle $\delta_C$ is obtained via the differential equation $$\frac{d}{dt}\delta_I = F_2(\delta_L) - r + u_2$$

$$\delta_C = F_1(\delta_L) + \delta_I + \frac{l_F - l_P}{v_x}r + u_1$$

$$u_1 = 0, u_2 = 0$$

for a simplified implementation.

3. A method according to claim 2, comprising selecting a prefilter having a transfer function $$F_2(s, v_x) = \frac{v_x}{l[1 + (v_x/v_{CH})^2]} \frac{1}{1 + T_2(v_x)s}$$

where $V_{ch}$ is a characteristic velocity; wherein the time constant $T_2(v_x)$ of the prefilter is predetermined as a function of the velocity $v_x$ such that the yaw movement is actuated only gently during steering.

4. The method according to claim 1 wherein a parameter $l_P$, which is dependent on the mass distribution, is entered into the microprocessor as a current value prior to use at each new start of the vehicle.

5. The method according to claim 1, wherein to improve the lateral dynamics the second input for further feedback signals is computed in the micro-processor as $$u_2 = \left(-\frac{1}{v_x} + k_P\right)[v_x F_2(\delta_L) - a_{yP}]$$

where $k_P$ is a controller parameter selected to result in a sufficiently fast vehicle response to steering commands.

6. The method according to claim 1, wherein the first input for further feedback signals is computed in the microprocessor as $$u_1 = -k_{DI}(v_x)\left[\frac{a_{yI} - a_{y2}}{l_a} + \frac{b}{v_x}r\right]$$

and the first feedback parameter $u_1$ is added to the supplemental steering angle $\delta_C$, where $b = c_F l/m l_R$, $c_F$ denotes a frontal cornering stiffness (in N/rad), and $k_{D1}(v_x)$ denotes a controller gain which is dependent on the driving speed $v_x$; and wherein a correlation exists between the controller gain $k_{D1}(v_x)$ and a yaw damping $D(v_x)$ through $$D^2(v_x) = \frac{c_R[(l_R + l_P)m l_R + k_{DI} c_F l]^2}{4v_x^2 m^2 l_R^2 \left(m l_P + \frac{l_F c_F}{l_R}k_{DI}\right)}$$

where $C_R$ is a rear concerning stiffness (in N/rad) such that the controller gain function $k_{D1}(v_x)$ is preselected according to the desired damping $D(v_x)$ dependence on the driving speed $v_x$.

7. The method according to claim 1, wherein both inputs $u_1$ and $u_2$ for further feedback signals are used by microprocessor calculation of $$u_1 = -k_{D2}(v_x)r$$

$$u_2 = -k_{D2}(v_x)\frac{b}{v_x}r$$

where $b = c_F(l/m l_R)$, $c_F$ denotes a frontal cornering stiffness (in N/rad) and $k_{D2}(v_x)$ is a controller gain which is dependent on the driving speed $v_x$; and wherein a correlation exists between the controller gain $k_{D2}(v_x)$ and the yaw damping $D(v_x)$ through $$D^2(v_x) = \frac{c_R l_R\left(l_R + l_P + \frac{l_F c_F}{l_R c_R}k_{D2}v_x\right)^2}{4v_x l_P(m l_R v_x + k_{D2}c_F l)}$$

such that the controller gain function $k_{D2}(v_x)$ is preselected according to the desired damping $D(v_x)$ dependence on the driving speed.

8. A method according to claim 1, comprising selecting a prefilter having a transfer function $$F_2(s, v_x) = \frac{v_x}{l[1 + (v_x/v_{CH})^2]} \frac{1}{1 + T_2(v_x)s}$$

where $V_{CH}$ is a characteristic velocity; wherein the time constant $T_2(v_x)$ of the prefilter is predetermined as a function of the velocity $v_x$ such that the yaw movement is actuated only gently during steering.

9. The method according to claim 1, where the integration from z to $\delta_I$, implying a transfer function $1/s$, is replaced by a fading integrator with $d_1 > 0$, $d_2 > 0$, implying a transfer funciton $$\frac{s}{s^2 + d_1 s + d_0}$$

from z to $\delta_I$, where parameters $d_1$ and $d_2$ are predetermined such that a step response behaves similar to an integrator for 0.5 to 1 s but then returns well-damped back to zero.

10. The method according to claim 1, wherein the sensor on the vehicle steering column comprises a potentiometer.

11. The method according to claim 1, wherein the sensor on the vehicle steering column comprises a capacitive sensor.

* * * * *